United States Patent [19]
Brusasco

[11] Patent Number: 5,143,533
[45] Date of Patent: Sep. 1, 1992

[54] METHOD OF PRODUCING AMORPHOUS THIN FILMS

[75] Inventor: Raymond M. Brusasco, Livermore, Calif.

[73] Assignee: The United States of America as represented by the Department of Energy, Washington, D.C.

[21] Appl. No.: 748,585

[22] Filed: Aug. 22, 1991

[51] Int. Cl.$^5$ .................................................. C03C 25/02
[52] U.S. Cl. ....................................... 65/18.1; 65/18.3; 65/36; 65/60.5; 65/60.8; 65/DIG. 4; 427/53.1
[58] Field of Search .................... 65/18.1, 18.3, 18.4, 65/60.5, 60.8, 36, 60.1, DIG. 4; 427/53.1

[56] References Cited
U.S. PATENT DOCUMENTS 4,617,206 10/1986 Haisma et al. .................. 427/53.1 X
4,767,429 8/1988 Fleming et al. .................. 65/18.1 X

FOREIGN PATENT DOCUMENTS 0136751 4/1985 European Pat. Off. ............. 65/60.5

Primary Examiner—Robert L. Lindsay
Attorney, Agent, or Firm—Miguel A. Valdes; Henry P. Sartorio; William R. Moser

[57] ABSTRACT

Disclosed is a method of producing thin films by sintering which comprises:
a. coating a substrate with a thin film of an inorganic glass forming particulate material possessing the capability of being sintered, and
b. irridiating said thin film of said particulate material with a laser beam of sufficient power to cause sintering of said material below the temperature of liquidus thereof.

Also disclosed is the article produced by the method claimed.

13 Claims, 2 Drawing Sheets

METHOD OF PRODUCING AMORPHOUS THIN FILMS

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

1. Field of the Invention

This invention relates to a method of producing amorphous thin films. More particularly, it relates to a method of sintering particulate material with a laser beam to produce amorphous optical thin films.

2. Disclosures of Interest

In the manufacture of lasers, semiconductors and other electronic or electro-optic devices, it is sometimes desirable to coat a substrate with a thin film of glass which has a different index of refraction than the substrate, and may be reflective or anti-reflective. For example, high peak-power laser systems, such as those used for fusion energy research, require reflective and anti-reflective optical coatings that are capable of handling pulsed laser powers up to $4 \times 10^9$ W/cm$^2$ (40 J/cm$^2$ in 10-ns) at 1060 nm without damage.

The thin films can be deposited on the substrate by a number of means, including electron beam evaporation, reactive sputtering and plasma CVD deposition.

The thin films could be produced by heating particulate glass forming material above the liquidus, pouring the liquid material over the substrate, and then allowing it to solidify. This is undesirable for a number of reasons. For example, the thin films which are poured cannot be made sufficiently flat to satisfy optical requirements of the coatings. Moreover, silica is the preferred thin film material and to heat it to the point where it becomes pourable requires that it be heated to a temperature of at least 2000° C. This requires considerable investment in equipment and energy costs. Glass forming materials which liquefy at temperatures lower than silica can be used, however, stress problems are encountered when they cool, thus requiring extra processing steps.

One solution to this problem is to sinter the materials into glass in situ on the substrate. The technique of sintering is described in a number of references. One in particular is U.S. Pat. No. 4,419,115, Johnson. In this patent there is described a method of forming a high silica, substantially alkali free glass by sintering an appropriate crystalline starting material at temperatures below the liquidus. The sintering is accomplished by forming a gel of the substance, drying the gel, then heating it to a temperature below the liquidus, but sufficient to cause viscous flow of the crystalline material in the gel.

The Johnson patent, however, is concerned with the sintering of bulk material, not thin films. The Johnson technique is not adaptable to thin films because the kinetics of sintering of bulk films is different than that of thin films. There is no correlation between the two.

What is needed in the art is a method of sintering thin films in situ on a substrate. The inventor has discovered such a technique utilizing a laser.

Laser-substrate interaction has been studied. Temple et al. (Temple, P.A., Lowdermilk, W.H. and Milam, D. Appl. Opt., 21, 3249, 1982) have described laser damage threshold increases for bare silica surfaces polished by $CO_2$ laser light. Strutt and Yi (Yi, J.J.L. and P.R. Strutt, Adv. Fusion of glass, 49.1, 1988) have prepared novel glassy material using rapid heating and cooling by $CO_2$ lasers. Haisma (Haisma. J., Appl. Opt., 24(16), 2666, 1985) has reported some general work in sintering $TiO_2$ layers for use as reflectors. Stewart et al. (Stewart, A. F., A. H. Guenther and F. E. Domann, AFWL/PA 87-830, submitted to Boulder Damage Symposium, The Properties of Laser Annealed Dielectric Films, 1987) have used $CO_2$ lasers as a post deposition annealing step on dielectrics prepared by e-beam evaporation, reactive sputtering and sol-gel. $CO_2$ lasers have also been used to anneal SiON thin films on Si wafers (Lam, D.K.W., Appl. Optics, 23(16), 2744, 1984).

None of the foregoing references describe the method of the present invention.

SUMMARY OF THE INVENTION

It is an object of this invention to provide a method of producing thin films on a substrate.

It is a further object of this invention to provide a method of producing a thin film of optical glass on a silica substrate.

It is yet another object of this invention to provide a method of sintering a thin film on a substrate using a laser.

It is a still further object of this invention to provide an article of manufacture which consists of a substrate coated with a sintered thin film of glass.

The method of the invention is carried out by coating a substrate with a thin film of an inorganic glass forming particulate material possessing the capability of being sintered, and irradiating the thin film of particulate material with a laser beam of sufficient power to cause sintering of the particulate material below the liquidus thereof and conversion to an amorphous state.

The article of manufacture of this invention comprises a substrate, preferably silica, which has a coating thereon of a thin film of an amorphous glass derived from particulate glass forming inorganic material converted to the dense amorphous state by laser sintering.

DETAILED DESCRIPTION OF THE INVENTION

Figure 1:
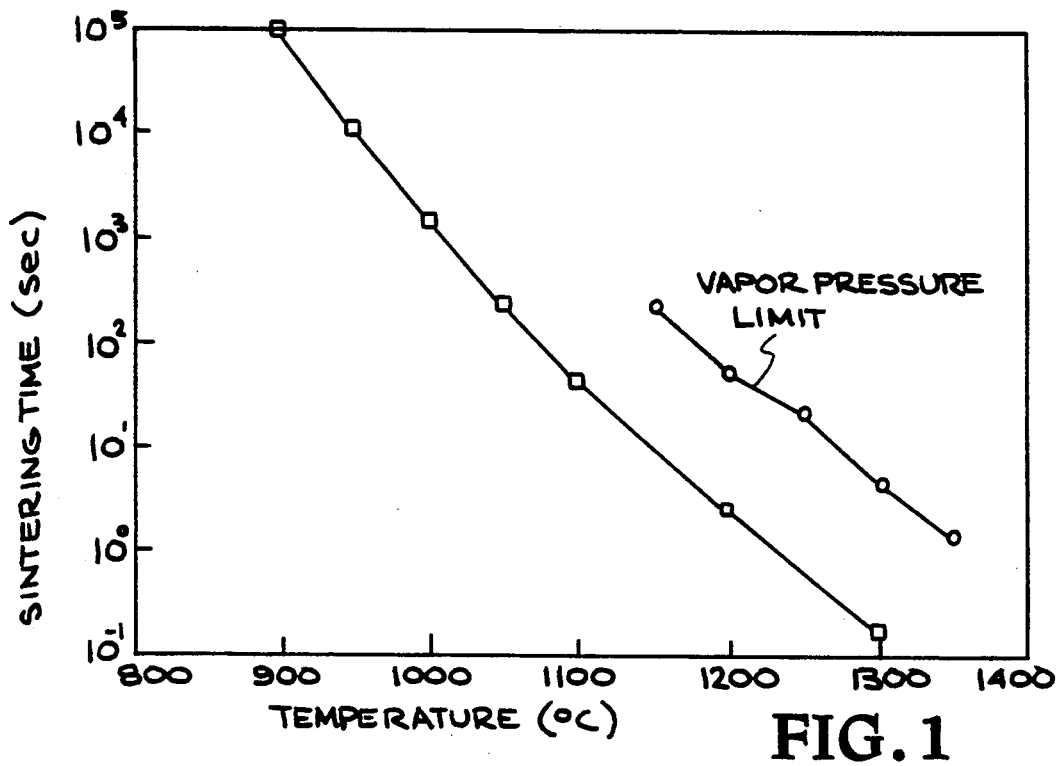
FIG. 1 is a graph illustrating the relationship of Sintering Time vs. Temperature for Sol-Gels used in the method of the invention.

In carrying out the method of this invention, a suspension of the material to be treated is first prepared. This suspension, preferably a sol-gel of colloidal silica, is prepared by the following technique.

Tetraethyl orthosilicate is fractionally distilled under nitrogen using a 120 cm vacuum jacketed and silvered Vigreux glass column fitted with an infinitely variable distillation head. The fraction boiling at 166°–167° C. is collected and stored in glass bottles under nitrogen prior to use.

Concentrated ammonium hydroxide solution (57% analytical reagent, 9.6 g) is then added to a solution of tetraethyl orthosilicate (31.2 g) in anhydrous ethyl alcohol (259 g) with stirring at room temperature. The reaction mixture is then allowed to stand at room temperature for three days to allow hydrolysis and sol formation to be completed. The final product consists of a colloidal suspension of $SiO_2$ particles in substantially anhydrous ethanol at a concentration of 3.0%.

After the gel is prepared, it is deposited on the surface of a substrate, and the substrate is then dried by heating it to a temperature sufficient to vaporize the volatiles.

After drying, the beam of a $CO_2$ laser is directed at the surface of the substrate containing the dried gel coating. The laser beam is strongly absorbed at the surface, raising the temperature very high at a rapid rate. The heat generated by the laser beam causes sintering of the particles in the gel. The temperature generated is sufficiently high so as to cause bonding of the particles to each other and to the substrate, but below the liquidus temperature.

As used herein, the term "liquidus" means the highest temperature for which there may be a crystal phase in equilibrium with the liquid phase for the particular composition. Also, the term "suspension" refers to a mixture of particulate material and a liquid which the particulate material never settles out.

The preferred substrate for use in the process of the invention is silica. Silica, however, is not the only substrate which can be used. Any substrate can be used which has an essentially zero coefficient of thermal expansion. One such substrate is a substance known as Zero-dur, manufactured by the Corning Corporation.

Suitable sol-gels, other than a silica gel, include gels of silica mixed with index modifiers or dopants such as titania or germania. Such index modifiers must be glass forming.

The preferred laser is a $CO_2$ laser. A suitable $CO_2$ laser for use in the process of this invention is one having a beam power of 48 watts, a beam wavelength of 10 to 11 $\mu$m, a beam diameter of 3 mm, and a beam speed of (A)=5 mm sec$^{-1}$, or (B)=3 mm sec$^{-1}$.

Range of Operating Parameters

In considering the operating parameters under which the method of this invention is carried out, there are three processes whose kinetics must be considered. In addition, there is a model of the thermal transport in the material with the source of heat being the laser beam and its interaction with the material and the heat loss from the surface of the material to the bulk and to the surrounding environment. Since the vapor pressure of silica will increase as the temperature increases, this will become a factor during heating as well.

Sintering Kinetics

The kinetics of sintering can be determined, to an approximate degree, from the work of Sacks and Scherer. Sacks (Sacks, M.D. and T.-Y. Tseng, J. Am. Ceram. Soc., 67(8), 532, 1984. Preparation of $SiO_2$ Glass from Model Powder Compacts: II, Sintering.) compares his sintering data with several models, including one by Scherer, and comes to the conclusion that, to first approximation, there is no difference in the model used to describe the sintering behavior. Scherer (Scherer, G.W., Surface and Colloid Science, vol. 14, Egon Matijevic ed., Plenum, 265, 1987. Viscous Sintering of Inorganic Gels.) presents a model similar in nature which considers an isotropic cubic unit cell of the pores of a compact. For this analysis there is a linear dependence on sintering rate versus reduced time, for some fraction of the sintering process. The Scherer rate constant for sintering is given by equation [1].

$$K = \left(\frac{\gamma}{\eta l_o}\right)\left(\frac{\rho_s}{\rho_o}\right)^{\frac{1}{3}} \quad [1]$$

where:

$\gamma$ = surface energy $$\left(\frac{erga}{cm^2}\right)$$

$\eta$ = viscosity (Pa s)
$\rho_s$ = theoretical solid density
$\rho_o$ = compact density The microstructural size parameter (R for Sacks, $l_o$ for Scherer) appears in the denominator so, as particle size decreases the rate of sintering increases. The rate of sintering is also a function of temperature and this is related to the temperature dependence of the viscosity. A calculation of the Scherer rate constant for several temperatures correctly predicts the sintering rate behavior as reported by Sacks. By substituting the fact that the particle size for sol-gel films is 200Å, and using the empirical data of Sacks as a baseline for sintering times, it is determined that the sintering rate for sol-gel should be 25 times faster.

FIG. 1 plots the sintering time versus temperature for 200Å sol-gel particles using the sintering rate and basing the times on the Sacks data. It is assumed that a processing time not more than 10 seconds is appropriate, thus temperatures >1150° C. would be useful. The additional curve on the plot is used to show the limitation due to the vapor pressure of the silica, which is described below.

Devitrification Kinetics

The kinetics of devitrification are sensitive to impurities in the unsintered compact. Thus, no specific information can be given except to say that the sol-gel process is one involving very low levels of impurities. To first order, one can say that the rate of devitrification is expected to be small if the processing temperature remains relatively low (<1400° C.).

Rate of Diffusion of Dopants Within the Glass Matrix

Shiraishi (Shiraishi K., Y. Aizawa and S. Kawakami, J. Lightwave Tech., 8(8), 1151, 1990. Beam Expanding Fiber Using Thermal Diffusion of the Dopant) has reported the diffusion coefficient for germanium in silica glass to be of the order of $10^{-16}$ m$^2$ sec$^{-1}$ at 1470K. Other literature reports put this value as low as $10^{18}$. This is a very low value. The inventor's personal experience has shown that at the temperatures contemplated for sintering of sol-gel to bulk glass, diffusion of germanium is not expected to be a problem. While values for the diffusion of titanium in glass are not available, it is not expected that titanium would behave much differently in glass than germanium.

Model of Heating the Surface of Silica With A $CO_2$ Laser Beam

The temperature can be estimated using the equation from Duley (Duley, W.W., Laser Processing and Analysis of Materials, Plenum, 1983.) (equation [2]).

$$T(0, 0, t) = \frac{I\sigma_o}{k\sqrt{\pi}} \tan^{-1}\left\{\left[\frac{4at}{r_o^2}\right]^{\frac{1}{2}}\right\} \quad [2]$$

where:
- $o$ = Incident fluence (W/cm$^2$)
- $r_o$ = beam radius (cm)
- $k$ = thermal conductivity of fused silica (W/cmK)
- $a = k/rC_p$
- $p = 2.2$ g/cm$^3$
- $C_p = 1.25$ J/gK
- $t$ = time (sec)

Figure 2:
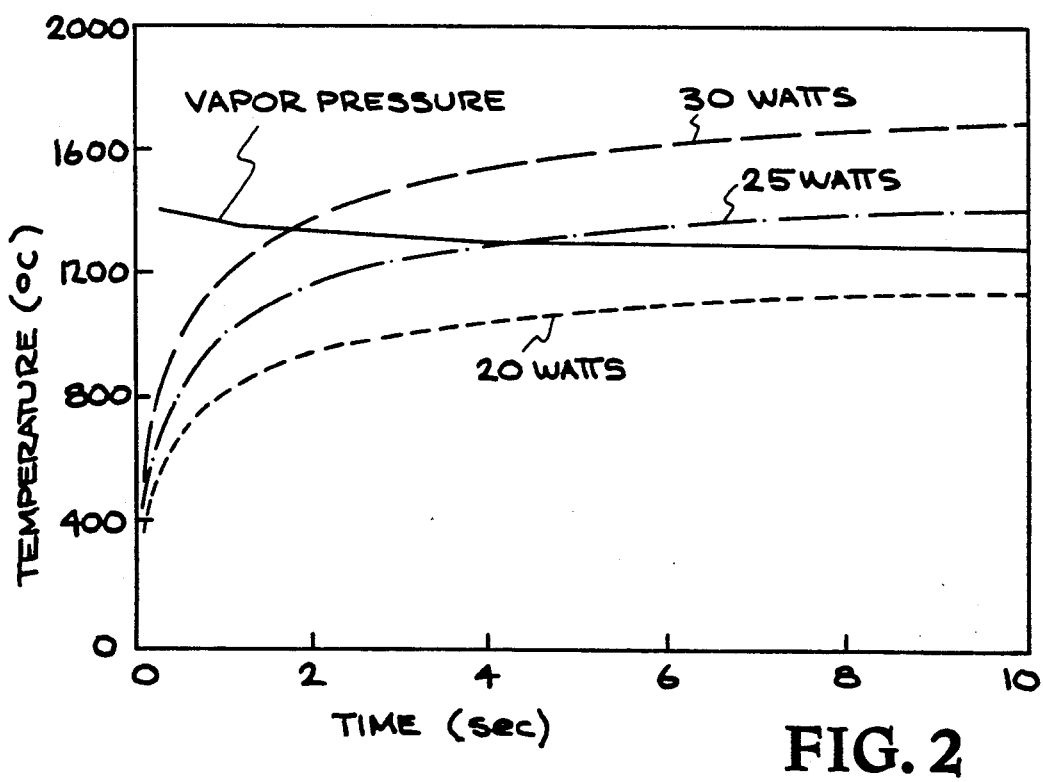
FIG. 2 is a graph illustrating the relationship of Temperature vs. Time for Laser Heating of Silica.

This analysis assumes a Gaussian spatial profile and predicts the temperature at the center of the spot as a function of time t. Taking typical values of materials parameter $a = 0.0105$, beam diameter $r_o = 0.3$ cm, beam translational speed of 0.5 cm sec$^{-1}$, and thermal conductivity of silica at 0.029 W cm$^{-1}$ K$^{-1}$, FIG. 2 plots the temperature of silica as a function of time of irradiation with laser power as a parameter. Clearly, if one needs a higher temperature, one must use a higher power for a fixed irradiation time or a slow time for a fixed laser power. This plot indicates that reasonable values of operating parameters would be laser power of 20-50 Watts with irradiation times of 1-10 seconds, resulting in a beam translation speed of 0.3-10 mm sec$^{-1}$. However, one must not work in a region above the vapor pressure limit shown on the graph (described below).

The vapor pressure at such temperatures can be estimated by the equation for the vapor pressure (equation [3]) and the mass lost due to evaporation by this vapor pressure can be estimated from the Langmuir equation (equation [4]).

$$1_n \text{SiO}_2 = 19.72\left[1 - \left(\frac{3075}{T}\right)\right]\{\text{atm}\} \quad [3]$$

where:
- T = temperature (°K)

$$W = 0.0585 \, P\sqrt{\frac{M}{T}} \quad [4]$$

where:
- W = mass flux of material $$W = \text{mass flux of material} \left(\frac{g}{cm^2 \, S}\right)$$

- M = molecular weight
- T = temperature (°K)

Figure 3:
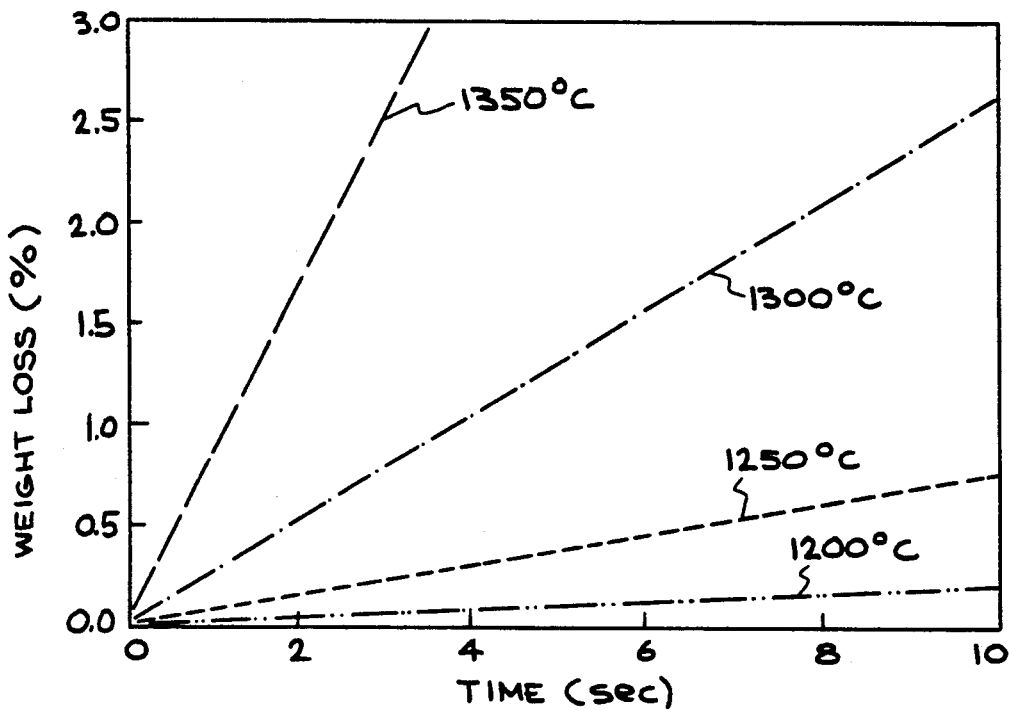
FIG. 3 is a graph showing Weight Loss as a function of time for Material Evaporation of materials used in the method of the invention when heated to a series of temperatures.
Figure 4:
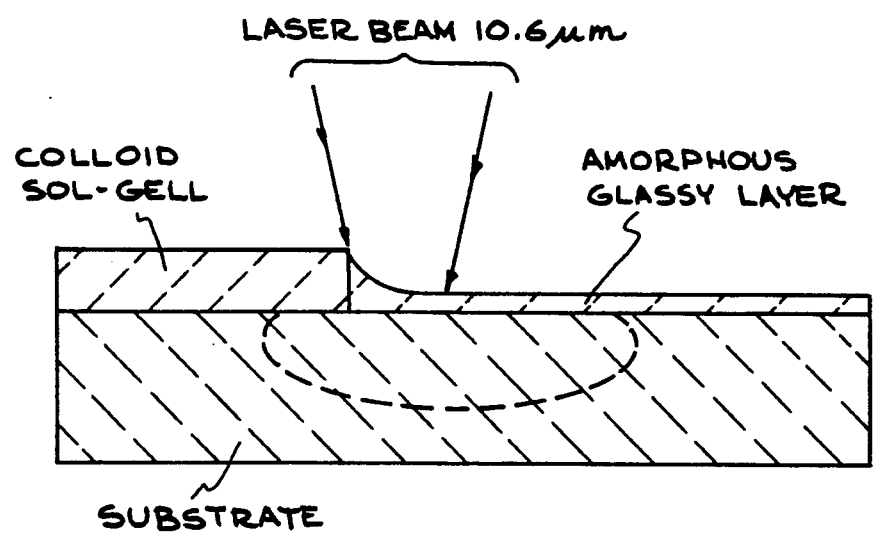
FIG. 4 is a saggital view of the article of the invention illustrating the transformation which occurs during the sintering process.

As FIG. 3 shows, if a figure of merit of 1% weight loss of material is used as a temperature limit in processing, then surface temperatures up to 1250° C. can be used if processing between 1-10 seconds, but 1300° C. temperatures require limiting the processing time to 4 seconds, etc.

Using this data, operating parameters that produce successful results are:
- Laser Power: 20-50 W
- Beam Diameter: 3 mm
- Beam Translation Speed: 0.3-10 mm sec$^{-1}$ This invention will be more fully understood by reference to the following examples which are intended to be illustrative of the invention, but not limiting thereof.

EXAMPLE 1

Several samples were exposed to a $CO_2$ laser, wavelength 10.6 μm, which caused them to "sinter". The results are set forth below in Table 1. Table 1 shows in detail the composition (B and C) of the samples, the beam characteristics (D, E, F) and observations (G) of what happened.

TABLE 1

| A | B | C | D | E | F | G |
|---|---|---|---|---|---|---|
| 1. | 30 | 70 | 42 | 1.0 | 2 | Scatters light |
|  | 20 | 80 | 44.4 | 1.0 | 3 | Optically clear - Visible material removal |
| 2. | 20 | 80 | 93 | 2.0 | 2 | Optically clear - Visible material removal |
| 3. | 30 | 70 | 93 | 2.0 | 2 | Optically clear - Visible material removal |
| 4. | 50 | 50 | 52 | 4.0 | 3 | Optically clear - cracks at beam edges |
| 5. | 9 | 91 | 51 | 4.0 | 3 | Optically clear |
| 6. | 33 | 66 | 50 | 4.0 | 3 | Optically clear |
| 7. | 50 | 50 | 50 | 4.0 | 3 | Scatters light |
| 8. | 23 | 77 | 50 | 5-15 | 3 | Scatters light |
| 9. | 13 | 87 | 50 | 5-15 | 3 | Scatters light |
| 10. | 0 | 100 | 50 | 4.0 | 3 | Scatters light |
| 11. | 0 | 100 | 50 | 2.0 | 3 | Optically clear |
| 12. | 0 | 100 | 50 | 3.0 | 3 | Optically clear |
| 13. | 0 | 100 | 50 | 4.2 | 3 | Scatters light |
| 14. | 0 | 100 | 50 | 2-4 | 3 | Optically clear |
| 15. | 6 | 94 | 50 | 4.2 | 3 | Optically clear |
| 16. | 6 | 94 | 50 | 2-4 | 3 | Scatters light |

Legend:
- A Sample No.
- B Weight % Titania
- C Weight % Silica
- D Laser Power (W)
- E Beam Speed (mm/sec)
- F Beam Diameter (mm)
- G Comments The specimens were characterized by qualitative scatter observation and profilometry of the untreated sol (to determine physical thickness) and the irradiated stripe. Laser damage threshold was measured for the early samples. The only sample not affected by $CO_2$ treatment was sample No. 4 which had a laser damage threshold of about 5 J/cm$^2$, due probably to the very high dopant concentration. For the others, while unsintered areas had laser damage thresholds of about 10-15 J/cm$^2$, sintered areas had thresholds of >40 J/cm$^2$.

Sample No. 8 consisted of several single beam passes to try and identify the best beam characteristics for sintering. Sample No. 9 was a repeat of the No. 8 experiment, but at lower titania concentration. The conclusion reached in this set was that only when some evaporative loss had occurred would there be a non-scattering irradiated area formed. Sample Nos. 10, 11 and 12 were meant to investigate the sintering properties of pure silica sol-gel. Once again, only when material was lost was there the added observation of a non-scattering irradiated area. Thus, the correct beam characteristics have not yet been found to give clear, flat areas.

In all cases irradiation of the sol-gel produces a shrinkage. This results in a channel along the beam path.

Table II below shows that even when it appears the beam conditions are the same, the shrinkage of the films can extend below the level of the sol-gel layer. This may be the result of different film conditions or a fluctuation in laser parameters.

TABLE 11

| Sample # | Composition[1] | Sol Depth | Sinter Depth | Power | Beam Speed | Diameter |
|---|---|---|---|---|---|---|
| 17. | 33/66 TiO$_2$ SiO$_2$ | 6450 Å | 5000 Å | 50 W | 4.0 | 3.0 |
| 18. | 6/94 TiO$_2$ SiO$_2$ | 3550 Å | 6000 Å | 50 W | 4.0 | 3.0 |
| 19. | 100 SiO$_2$ | 5500 Å | 4400 Å | 50 W | 4.0 | 3.0 |

The optical spectra of irradiated areas have not revealed any detail as yet. With small stripes, it is difficult to aperture the spectrometer beam properly. With large areas it is difficult to determine the "layer" thickness due to a preferential loss of silica when a non-scattering area with material loss is formed. In the cases where the dopant level is fairly high and evaporation has occurred, the stripe is sufficiently reflective to cause a shadow on the rear surface of the substrate.

The CO$_2$ laser is particularly adapted for use in the method of this invention because the beam is absorbed at the surface of the silica gel, i.e., 10.6 μm is absorbed at the surface. Any other laser can be used which projects a beam which is absorbed by fused silica.

The material which is selected for sintering in the method of this invention should be one having a low co-efficient of thermal expansion, or one whose co-efficient of thermal expansion is approximately the same as that of the substrate.

The preferred material is fused silica, which is deposited in a colloidal suspension (gel) on a silica wafer.

Fused silica has a co-efficient of expansion of $4.8 \times 10^{-7}$.

It is desirable to have a gel material with a low co-efficient of expansion in order to prevent cracking of the substrate when the gel is heated up by the laser beam.

EXAMPLE 2

(One-layer-at-a-time) A colloidal silica suspension is prepared by mixing 9.6 grams of 57% ammonium hydroxide reagent to 31.2 grams of tetraethylorthosilicate in anhydrous ethyl alcohol. After three days, the ammonia in solution is removed by boiling and the sol is ready for use.

A colloidal suspension of titania is prepared in a manner similar to that reported by Woodhead (Woodhead, J.L., Sci. Ceram., 9, 29, 1977. Sol-gel processes for titania-based products.). 0.22 mole of a titanium alkoxide, such as 62.48 grams of titanium isopropoxide, are hydrolyzed in 1 liter of water to give a 0.22 molar mixture of titanium (IV) hydroxide. This slurry is then peptized by the addition of 1.06 grams of HCl. 100% of the TiO$_2$ prepared is peptized after 14 days.

Ten milliliters of 3.0% colloidal suspension is deposited onto a silica substrate (50 mm diameter × 10 mm thick) while spinning at approximately 2000 RPM to give a coating approximately 200 nm thick of pure silica. Layers doped with titanium or germanium are prepared by mixing the two colloidal suspensions in the appropriate amounts, for example 1-5 wt % Ti or Ge, and spinning as described above. Once dry, no further processing for this layer is necessary.

This coating is then sintered by raster scanning a 3 mm diameter CO$_2$ laser beam at a rate of 3 mm/sec over the surface at a power of 50 W to form a clear, hard layer approximately 100 nm thick on the silica substrate. The process is repeated as needed to increase the thickness of the layers and deposit layers such that the dopant ion concentration varies almost continuously throughout the depth of the coating.

EXAMPLE 3

(Sintering a Multilayer) A colloidal silica suspension is prepared by mixing 9.6 grams of 57% ammonium hydroxide reagent to 31.2 grams of tetraethylorthosilicate in anhydrous ethyl alcohol. After three days, the ammonia in solution is removed by boiling and the sol is ready for use.

A colloidal suspension of titania is prepared in a manner similar to that described in Example 2. 0.22 mole of a titanium alkoxide, such as 62.48 grams of titanium isopropoxide, are hydrolyzed in 1 liter of water to give a 0.22 molar mixture of titanium (IV) hydroxide. This slurry is then peptized by the addition of 1.06 grams of HCl. 100% of the TiO$_2$ prepared is peptized after 14 days.

Ten milliliters of 3.0% colloidal suspension is deposited onto a silica substrate (50 mm diameter × 10 mm thick) while spinning at approximately 2000 RPM to give a coating approximately 200 nm thick of pure silica. Layers doped with titanium or germanium are prepared by mixing the two colloidal suspensions in the appropriate amounts, for example 1-5 wt % Ti or Ge, and spinning as described above.

An optical multilayer is built up by alternately applying layers of pure silica sol and mixed sol, scaling the layer thickness appropriately. After several layer pairs have been deposited, the layers are sintered by raster scanning of a point focussed CO$_2$ laser beam at 3 mm/sec using a power of 50 W to form a clear layer of silica glass matrix with a dopant ion distributed periodically through the depth of the matrix.

The foregoing description of preferred embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention in various embodiments and with various modifications, as are suited to the particular use contemplated. It is intended that the scope of the invention be defined by the claims appended hereto.

I claim:

1. A method of producing a transparent thin film of amorphous material on a substrate by sintering which comprises:
   a. coating a substrate with a thin film of an inorganic glass forming particulate material possessing the capability of being sintered; and
   b. irradiating said thin film of said particulate material for a period of from about 1 to about 10 seconds with a laser beam at a beam translation speed of 0.3-10 mm/sec and of sufficient power to cause sintering of said inorganic glass forming particulate material below the temperature of liquidus thereof, and to convert said particulate material to an amorphous transparent thin film on said substrate.

2. The method of claim 1 wherein said inorganic particulate material is contained in a colloidal suspension.

3. The method of claim 1 wherein said laser beam is derived from a $CO_2$ laser having a beam wavelength about 10 to 11 $\mu$m.

4. The method of claim 2 wherein said colloidal suspension comprises silica doped with titania.

5. The method of claim 4 wherein said thin film is heated by said laser beam to a temperature of about 1000° C.

6. The method of claim 1 wherein said substrate comprises silica.

7. The method of claim 1 wherein said material is arranged in a thin film having a thickness ranging from about 500 to about 3000Å.

8. The method of claim 1 wherein said laser beam has a beam diameter of about 3 mm.

9. The method of claim 1 wherein said thin film of inorganic glass forming particulate material coated on said substrate comprises a sol-gel film having a particle size of about 200Å.

10. A method of producing a transparent thin film of an amorphous glass on a substrate by sintering a layer of particulate glass on said substrate with a laser beam which comprises:
   a. forming a thin film of sinterable particulate glass on a substrate; and
   b. irradiating said thin film of said sinterable particulate glass with a laser beam having a power range of from about 20 to about 50 watts and a beam translation speed of from about 0.3 to about 10 mm/sec to sinter said particulate glass to form said transparent thin film of amorphous glass on said substrate.

11. The method of claim 10 wherein said laser beam has a diameter of about 3 mm and said thin film is irradiated for a time period of from about 1 to about 10 seconds.

12. The method of claim 10 wherein the particle size of said sinterable particulate glass in said thin film is about 200Å.

13. A method of producing a transparent thin film comprising amorphous silica glass on a silica substrate by sintering the particles in one or more dried layers comprising a silica gel on said silica substrate with a $CO_2$ laser beam which comprises:
   a. forming a suspension comprising a sol-gel of colloidal silica;
   b. applying one or more of said layers of said colloidal silica-containing suspension to said silica substrate;
   c. drying said substrate to remove solvents from said one or more layers on said substrate; and
   d. irradiating said one or more layers comprising said colloidal silica for an irradiation time period of from about 1 to about 10 seconds with a laser beam having a beam diameter of about 3 mm, a power range of from about 20 to about 50 watts, and a beam translation speed of from about 0.3 to about 10 mm/sec to sinter said particles in said one or more colloidal silica-containing layers and to thereby form a transparent thin film comprising amorphous silica glass on said silica substrate.

* * * * *